US012809212B2

(12) United States Patent
Melena et al.

(10) Patent No.: US 12,809,212 B2
(45) Date of Patent: *Nov. 24, 2026

(54) LIQUID CRYSTAL DISPLAY WITH EXTERNAL RETARDER

(71) Applicant: Snap Inc., Santa Monica, CA (US)

(72) Inventors: Nicholas William Melena, Phoenix, AZ (US); Terry James Scheffer, Hilo, HI (US)

(73) Assignee: Snap Inc., Santa Monica, CA (US)

( * ) Notice: Subject to any disclaimer, the term of this patent is extended or adjusted under 35 U.S.C. 154(b) by 588 days.

This patent is subject to a terminal disclaimer.

(21) Appl. No.: 18/347,351

(22) Filed: Jul. 5, 2023

(65) Prior Publication Data

US 2023/0350247 A1 Nov. 2, 2023

Related U.S. Application Data

(63) Continuation of application No. 17/297,811, filed as application No. PCT/US2019/065114 on Dec. 7, 2019, now Pat. No. 11,782,315.

(Continued)

(51) Int. Cl.

*G02F 1/13363* (2006.01)
*G02F 1/1335* (2006.01)
*G02F 1/1362* (2006.01)

(52) U.S. Cl.

CPC .................. *G02F 1/133638* (2021.01); *G02F 1/133531* (2021.01); *G02F 1/13363* (2013.01); *G02F 1/136277* (2013.01); *G02F 2413/05* (2013.01)

(58) Field of Classification Search

CPC ......... G02F 1/133555; G02F 1/133553; G02F 1/136277; G02F 1/133638

See application file for complete search history.

(56) References Cited

U.S. PATENT DOCUMENTS 5,576,854 A 11/1996 Schmidt et al.
9,134,571 B2 9/2015 Kashima et al.

(Continued)

FOREIGN PATENT DOCUMENTS

CN 101802663 A 8/2010
CN 108319069 A * 7/2018 ....... G02F 1/136277

(Continued)

OTHER PUBLICATIONS

U.S. Appl. No. 17/297,811, filed May 27, 2021, Liquid Crystal Display With External Retarder.

(Continued)

*Primary Examiner* — Alexander P Gross

(74) *Attorney, Agent, or Firm* — Schwegman Lundberg & Woessner, P.A.

(57) ABSTRACT

A system includes a spatial light modulator comprising a first substrate, a second substrate, and a liquid crystal layer between the first substrate and the second substrate. The spatial light modulator is characterized by a first retardation and a first phase retardation and has a first slow axis for light propagation. A voltage source is configured to apply a drive voltage to the spatial light modulator is a function of the drive voltage. A retarder is positioned external to the spatial light modulator and is characterized by a second retardation and a second phase retardation. The retarder includes a second slow axis for light propagation. The second retardation has a value such that all illumination wavelengths in a set of illumination wavelengths are above or below a phase retardation value of 0.25. The set of illumination wavelengths includes at least one illumination wavelength in each of at least three different color spectrums.

20 Claims, 11 Drawing Sheets

Related U.S. Application Data

(60) Provisional application No. 62/776,794, filed on Dec. 7, 2018.

(56) References Cited

U.S. PATENT DOCUMENTS

| | | | | |
|---|---|---|---|---|
| 11,782,315 | B2 * | 10/2023 | Melena | G02F 1/133638 349/56 |
| 2002/0041351 | A1 | 4/2002 | Baek | |
| 2002/0063818 | A1 | 5/2002 | Anderson et al. | |
| 2004/0188643 | A1 | 9/2004 | Weiss et al. | |
| 2005/0052591 | A1 * | 3/2005 | Joten | G02F 1/13363 349/114 |
| 2005/0219476 | A1 * | 10/2005 | Beeson | G03B 21/28 353/98 |
| 2006/0215091 | A1 | 9/2006 | Muramoto et al. | |
| 2007/0064163 | A1 * | 3/2007 | Tan | G02B 5/3058 349/5 |
| 2007/0085972 | A1 * | 4/2007 | Tan | H04N 9/3182 348/E9.027 |
| 2009/0002579 | A1 | 1/2009 | Tan | |
| 2010/0231835 | A1 | 9/2010 | Nakagawa et al. | |
| 2013/0135565 | A1 | 5/2013 | Sera et al. | |
| 2014/0126055 | A1 | 5/2014 | Wang et al. | |
| 2017/0099133 | A1 | 4/2017 | Gu et al. | |
| 2020/0084483 | A1 | 3/2020 | Brown et al. | |
| 2022/0050332 | A1 | 2/2022 | Melena et al. | |

FOREIGN PATENT DOCUMENTS

| | | | |
|---|---|---|---|
| CN | 110262133 | A | 9/2019 |
| CN | 113196154 | A | 7/2021 |
| EP | 3891555 | A2 | 10/2021 |
| EP | 3891555 | B1 | 3/2026 |
| JP | H11311784 | A | 11/1999 |
| JP | 2000047194 | A | 2/2000 |
| JP | 2000187220 | A | 7/2000 |
| JP | 2002148584 | A | 5/2002 |
| JP | 2003050396 | A | 2/2003 |
| JP | 2008506974 | A | 3/2008 |
| JP | 2022511034 | A | 1/2022 |
| JP | 7337313 | B2 | 8/2023 |
| KR | 20010102804 | A | 11/2001 |
| KR | 20210119387 | A | 10/2021 |
| KR | 102562650 | B1 | 8/2023 |
| TW | 201443529 | A | 11/2014 |
| TW | 202028835 | A | 8/2020 |
| TW | I826607 | B | 12/2023 |
| WO | WO-2018180867 | A1 | 10/2018 |
| WO | WO-2020146072 | A2 | 7/2020 |
| WO | WO-2020146072 | A3 | 11/2020 |

OTHER PUBLICATIONS

"U.S. Appl. No. 17/297,811, Corrected Notice of Allowability mailed Aug. 31, 2023", 2 pgs.
"Chinese Application Serial No. 201980080785.9, Office Action mailed Nov. 1, 2023", w/ English Translation, 21 pgs.
"Chinese Application Serial No. 201980080785.9, Response Filed Dec. 25, 2023 to Office Action mailed Nov. 1, 2023", w/ English Claims, 26 pgs.
"Taiwanese Application Serial No. 108144770, Office Action mailed Jun. 28, 2023", w/ English Translation, 17 pgs.
"U.S. Appl. No. 17/297,811, Final Office Action mailed Jan. 25, 2023", 10 pgs.
"U.S. Appl. No. 17/297,811, Non Final Office Action mailed Aug. 31, 2022", 13 pgs.
"U.S. Appl. No. 17/297,811, Notice of Allowance mailed Apr. 6, 2023", 11 pgs.
"U.S. Appl. No. 17/297,811, Preliminary Amendment filed May 27, 2021", 8 pgs.
"U.S. Appl. No. 17/297,811, Response filed Mar. 22, 2023 to Final Office Action mailed Jan. 25, 2023", 9 pgs.
"U.S. Appl. No. 17/297,811, Response filed Nov. 7, 2022 to Non Final Office Action mailed Aug. 31, 2022", 9 pgs.
"European Application Serial No. 19908888.1, Extended European Search Report mailed Jun. 17, 2022", 14 pgs.
"International Application Serial No. PCT/US2019/065114, International Preliminary Report on Patentability mailed Jun. 17, 2021", 9 pgs.
"International Application Serial No. PCT/US2019/065114, International Search Report mailed Sep. 30, 2020", 2 pgs.
"International Application Serial No. PCT/US2019/065114, Written Opinion mailed Sep. 30, 2020", 7 pgs.
"Japanese Application Serial No. 2021-531741, Notification of Reasons for Refusal mailed Jun. 28, 2022", w/ English translation, 14 pgs.
"Japanese Application Serial No. 2021-531741, Response filed Dec. 19, 2022 to Notification of Reasons for Refusal mailed Jun. 28, 2022", w/ English Claims, 14 pgs.
"Korean Application Serial No. 10-2021-7021377, Notice of Preliminary Rejection mailed Nov. 18, 2022", w/ English Translation, 18 pgs.
Hendrix, Karen, et al., "Birefringent films for contrast enhancement of liquid crystal on silicon projection systems", Journal of Vacuum Science, American Institute of Physics, 2 Huntington Quadrangle, Melville, NY 11747, vol. 24, No. 4, (Jun. 23, 2006), 1546-1551.
"Korean Application Serial No. 10-2021-7021377, Response filed Feb. 20, 2023 to Notice of Preliminary Rejection mailed Nov. 18, 2022", 36 pgs.
"European Application Serial No. 26158825.5, Extended European Search Report mailed May 11, 2026", 7 pgs.
"European Application Serial No. 19908888.1, Response filed Jan. 4, 2023 to Extended European Search Report mailed Jun. 17, 2022", 16 pgs.

* cited by examiner

LIQUID CRYSTAL DISPLAY WITH EXTERNAL RETARDER

CROSS-REFERENCE TO RELATED APPLICATIONS

This application is a continuation of U.S. patent application Ser. No. 17/297,811, filed May 27, 2021, which application is a U.S. national phase application of PCT/US2019/065114, filed Dec. 7, 2019, designating the United States, which claims the benefit of U.S. Provisional Patent App. No. 62/776,794, filed Dec. 7, 2018, which are all hereby incorporated by reference herein in their entireties.

TECHNICAL FIELD

This disclosure relates to spatial light modulators (SLMs) (e.g., displays, liquid crystal displays (LCDs), liquid crystal microdisplays, and liquid crystal spatial light modulators (SLMs)) which have independently operable pixels, More particularly, the present invention is directed to spatial light modulators, for example, Liquid Crystal on Silicon (LCoS) spatial light modulators or displays, used in applications including, but not limited to, projectors, head-up displays, and augmented reality (AR), mixed reality, and virtual reality (VR) systems or devices, such as headsets.

BACKGROUND

Liquid crystal SLMs for imaging applications include types that use ferroelectric liquid crystals and types that use nematic liquid crystals. The liquid crystal in the nematic types can have positive or negative dielectric anisotropies. The negative anisotropy types generally have higher contrast ratios and are preferred for projection applications and near-eye applications such as in AR and VR headsets. SLMs using liquid crystals with a negative dielectric anisotropy use electro-optic modes which include the Vertically Aligned Nematic (VAN) display mode and the Twisted Vertically Aligned Nematic (TVAN) display mode. TVANs are described in U.S. Pat. Nos. 8,724,059 and 9,551,901, incorporated herein by reference.

Conventional optical designs for viewing images from reflective liquid crystal SLMs use linear polarized light in combination with polarizing beam splitters (PBS) of the wire-grid-type and the MacNeille-cube-type to achieve high-contrast images. A disadvantage of using these types of PBS is that they take up a relatively large volume, which makes it difficult to obtain streamlined, compact product designs that are used in AR and VR headsets. Furthermore, the use of a PBS is known to decrease image brightness, increase the dynamic switching time, and enhance the visibility of fringing field effects between neighboring pixels, especially in high-resolution SLM devices with short pixel pitches.

SUMMARY

To overcome these shortfalls of designs using a PBS, Kuan-Hsu Fan-Chiang, Shu-Hsia Chen, and Shin-Tson Wu describe an optical design that does not use a PBS in Applied Physics Letters, Volume 87, pp. 031110-1 to 031110-3 (2005). Their VAN mode LCoS SLM is illuminated with broadband circular polarization (CP) (e.g., instead of linear polarization) to overcome long-standing problems of poor sharpness, low brightness, and slow response times. Electro-optic (EO) curves are not presented in the Chiang et al. publication, nor is the wavelength or wavelengths of the illumination given. In addition, the authors only consider one orientation of the circular polarizer.

One having skill in the art will recognize that broadband circular polarized light can be created by a linear polarizer with its polarization axis aligned either parallel to or perpendicular to the input axis of a broadband circular polarizer. Broadband circular polarized light can also be created by a linear polarizer with its polarization axis set at ±45° to the slow axis of a broadband quarter-wave plate (QWP), which includes retarders including a plurality of birefringent layers.

Phase retardation ($\phi$) is a dimensionless quantity defined by the retardation ($\Gamma$) divided by the illumination wavelength $\lambda$ (i.e., $\phi=\Gamma/\lambda$). The retardation $\Gamma$ is the distance between the wavefronts of the fast ray and the slow ray of incoming light after passing through a birefringent material.

The practical broadband QWPs that are commercially available from a number of suppliers are not ideal broadband QWPs. Teijin, Ltd., Tokyo, Japan, for example, supplies a FM-143 single-layer broadband QWP. The wavelength dependence of the phase retardation of the FM-143 broadband QWP is given in the graph of FIG. 2. The graph shows that the phase retardation $\phi$ is greater than 0.25 for wavelengths shorter than 555 nm but less than a 0.25 for wavelengths longer than 555 nm. It will be shown that the deviation of the phase retardation $\phi$ from 0.25 has a significant impact on the shape of the electro-optic (EO) curve and the contrast ratio.

FIGS. 3 and 4 show computer simulations made in the present disclosure based on the scheme described in Kuan-Hsu Fan-Chiang's publication. These electro-optic (EO) curves are on linear and logarithmic throughput scales for red, green, and blue wavelengths of 628 nm, 513 nm, and 453 nm, respectively. Throughput is the reflectance assuming linear polarized input light, an ideal polarizer with transmittances of 1 and 0, and an ideal reflector with a reflectance of 1.

For this case, the slow axis of the FM-143 broadband QWP is oriented perpendicular to the slow axis of the VAN mode SLM, which is parallel to the azimuthal alignment direction of the surface-contacting liquid crystal directors on the inner surfaces of the transparent first substrate and the reflective second substrate of the SLM. The EO curves on the logarithmic scale of FIG. 4 for blue and green illumination exhibit near-zero throughput minimums in the throughput at drive voltages other than zero, whereas the EO curve for red illumination does not.

The near-zero throughput minimum in the EO curves for blue and green illumination can be exploited to achieve contrast ratios greater than 2000. In particular, the drive voltages are set to achieve dark pixels at values that are at or near the voltages to achieve near-zero throughput minimums in the EO curves for blue and green illumination colors. The drive voltages, to achieve bright pixels on the grayscale continuum, are set at voltages that are greater than the voltages applied to achieve the near-zero throughput minimums.

Referring momentarily to FIGS. 3 and 4, the horizontal axes show a continuum of voltages from 0 to 10 volts. The pixel is in its darkest state at the voltage corresponding to the near-zero throughput minimum. Gray levels are achieved by applying voltages higher than this near-zero throughput minimum voltage on the continuum where the throughput increases.

However, for the red illumination, there is no such near-zero throughput minimum in the EO curve, and the contrast ratio is only around 50. Contrast ratio is defined as the ratio of the maximum throughput divided by the throughput minimum in the EO curve.

Similarly, FIGS. 5 and 6 show EO curves on linear and logarithmic scales for the case where the slow axis of the FM-143 broadband QWP is oriented parallel to the slow axis of the VAN mode SLM. The throughput of the EO curve for red illumination on the logarithmic scale of FIG. 6 exhibits a near-zero throughput minimum at drive voltages other than zero. In contrast, the EO curves for the blue and green illumination do not exhibit a near-zero throughput minimum at drive voltages other than zero.

By exploiting the near-zero throughput minimum in the EO curve for red illumination, the red contrast ratio can be well over 2000. However, since for blue and green illumination there is no near-zero throughput minimum in the EO curve, the contrast ratios for blue and green illumination are unacceptably low at 110 and 210, respectively. Broadband QWPs are therefore not suitable for applications that require high contrast (e.g., greater than 2000) for all illumination wavelengths required for high quality, full-color images.

The present invention maintains the advantages of the relevant art broadband QWP scheme including compact, streamlined designs, short dynamic switching times, and near invisibility of interpixel defects. In addition, the present invention overcomes the disadvantage of not being able to achieve high contrast ratios for all the illumination wavelengths required for high contrast, full-color operation.

A system in accordance with the present invention includes one or more retarders that are external to a spatial light modulator (e.g. a display such as a reflective liquid crystal display or LCoS display, such as a reflective LCoS display). The retarders produce a phase retardation $\phi$ that is greater than 0.25 for at least three illumination wavelengths that are used to form a color image (e.g., a full-color image). For example, phase retardation $\phi$ varies between and including 0.26 and 0.40.

Alternatively, the retarders produce phase retardation that is less than 0.25 for at least three illumination wavelengths used to form a color image (e.g., a full color image). For example, phase retardation varies between and including 0.10 and 0.24.

In an embodiment of the present invention, at least three illumination wavelengths include wavelengths corresponding to at least red, green, and blue, but could also include wavelengths of other colors such as yellow. For example, in an embodiment of the present invention, a retarder, or a combination of retarders having different retardations $\Gamma$, which are external to a spatial light modulator, produce a phase retardation $\phi$ that is either larger than 0.25 for all the illumination wavelengths or smaller than 0.25 for all illumination wavelengths. The illumination wavelengths are used to obtain images including color images such as full-color images.

In an embodiment of the present invention, the phase retardation $\phi$ of the external retarder is greater than 0.25 for three different illumination wavelengths or colors. For example, in an embodiment of the present Invention, three different illumination wavelengths or colors, for example, illumination wavelengths corresponding to a wavelengths in each of the red, green, and blue illumination wavelength bands (i.e., 625-740 nm wavelength band for red, 500-565 nm wavelength band for green, and 450-485 nm wavelength band for blue), are used in a display, for example, a full-color display. Accordingly, any light incident on the SLM is not circularly polarized at these wavelengths (e.g., a phase retardation of 0.25 generates circularly polarized light). It should be understood by one of ordinary skill in the art that the illumination colors, for example, could also include a yellow illumination color.

In an embodiment, the slow axis of the retarder is aligned perpendicular or substantially perpendicular to the slow axis of a SLM, for example, VAN or TVAN SLM. At zero volts applied to the SLM, any residual amount of retardation $\Gamma$ of the SLM (e.g., introduced by the pretilt angle of the surface contacting directors inside the liquid crystal SLM) subtracts from the retardation $\Gamma$ produced by the external retarder. Here, the combined phase retardation $\phi$ produced by the SLM and retarder may be larger than 0.25, leading to a non-zero throughput. As the voltage applied to the SLM is increased from zero, the retardation $\Gamma$ of the SLM increases and subtracts from the retardation $\Gamma$ of the external retarder until a point is reached where the combined phase retardation $\phi$ of the retarder and SLM is equal to 0.25. At this point, the throughput of the combination is zero because the input polarization is rotated 90° and gets absorbed in the polarizer upon reflection. As the voltage is further increased, the combined phase retardation $\phi$ decreases from 0.25 with a simultaneous increase in throughput because the polarization rotation is no longer 90°.

Thus, at zero volts the throughput is not zero. The throughput dips to a near-zero minimum at the voltage where the combined phase retardation $\phi$ is 0.25 and then increases again at higher voltages (e.g., higher than the voltage where the near-zero throughput minimum occurs). With this type of electro-optic curve, high throughput and contrast ratios (e.g., greater than 2000) can be achieved by setting the pixel drive voltage at or near the voltage where the near-zero throughput minimum occurs in the electro-optic curve to achieve a dark pixel. The pixel drive voltage is increased above the voltage where the near-zero throughput minimum occurs to achieve pixel gray levels of increased brightness. Contrast ratio is defined as the ratio of the maximum throughput divided by the throughput at the near-zero minimum in the EO curve.

In another embodiment of the present invention, the phase retardation $\phi$ of the external retarder is less than 0.25 for the red, green, and blue wavelengths used in the color display (e.g., a full-color display), which means that the light incident on the LCoS imaging cell is not circularly polarized at these wavelengths (e.g., a phase retardation of 0.25 generates circularly polarized light). In this embodiment, the slow axis of the retarder is aligned parallel or substantially parallel to the slow axis of the VAN or TVAN SLM. At zero applied volts the residual retardation $\Gamma$ of the SLM introduced by a non-90° pretilt angle of the surface contacting directors inside the liquid crystal SLM adds to the retardation of the external retarder. Here, the combined phase retardation $\phi$ of the retarder and SLM can be less than 0.25, leading to a non-zero throughput.

As the voltage applied to the SLM is increased from zero, the retardation $\Gamma$ of the SLM increases and adds to the retardation $\Gamma$ of the external retarder until a point is reached where the combined phase retardation $\phi$ of the retarder and SLM is 0.25. At this point, the throughput of the combination is zero because the input polarization is rotated 90° and gets absorbed in the polarizer upon reflection. As the voltage is further increased, the combined phase retardation $\phi$ increases from 0.25 with a simultaneous increase in throughput because the polarization rotation is no longer 90°.

Thus, at zero volts the throughput is not zero. The throughput dips to a near-zero minimum at the voltage where the combined phase retardation $\phi$ is 0.25 and then increases again at higher voltages. With this type of electro-optic curve, high throughput and contrast ratios greater than 2000 can be achieved by setting the pixel drive voltage at or near the voltage where the near-zero throughput minimum occurs in the electro-optic curve to achieve a dark pixel. The pixel drive voltage is increased above this value to achieve pixel gray levels of increased brightness.

The foregoing has broadly outlined some of the aspects and features of the various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

A system in accordance with the present invention includes a retarder, or a combination of retarders having retardations Γ, which are external to a spatial light modulator (SLM). The retarder or combination of retarders produces a phase retardation ϕ for all illumination wavelengths that is either larger than 0.25 for all the illumination wavelengths or smaller than 0.25 for all illumination wavelengths. The illumination wavelengths render images. For example, the images are color images such as full-color images.

According to a system in accordance with the present invention, the SLM is, for example, a liquid crystal display, such as a reflective liquid crystal display.

Figure 1:
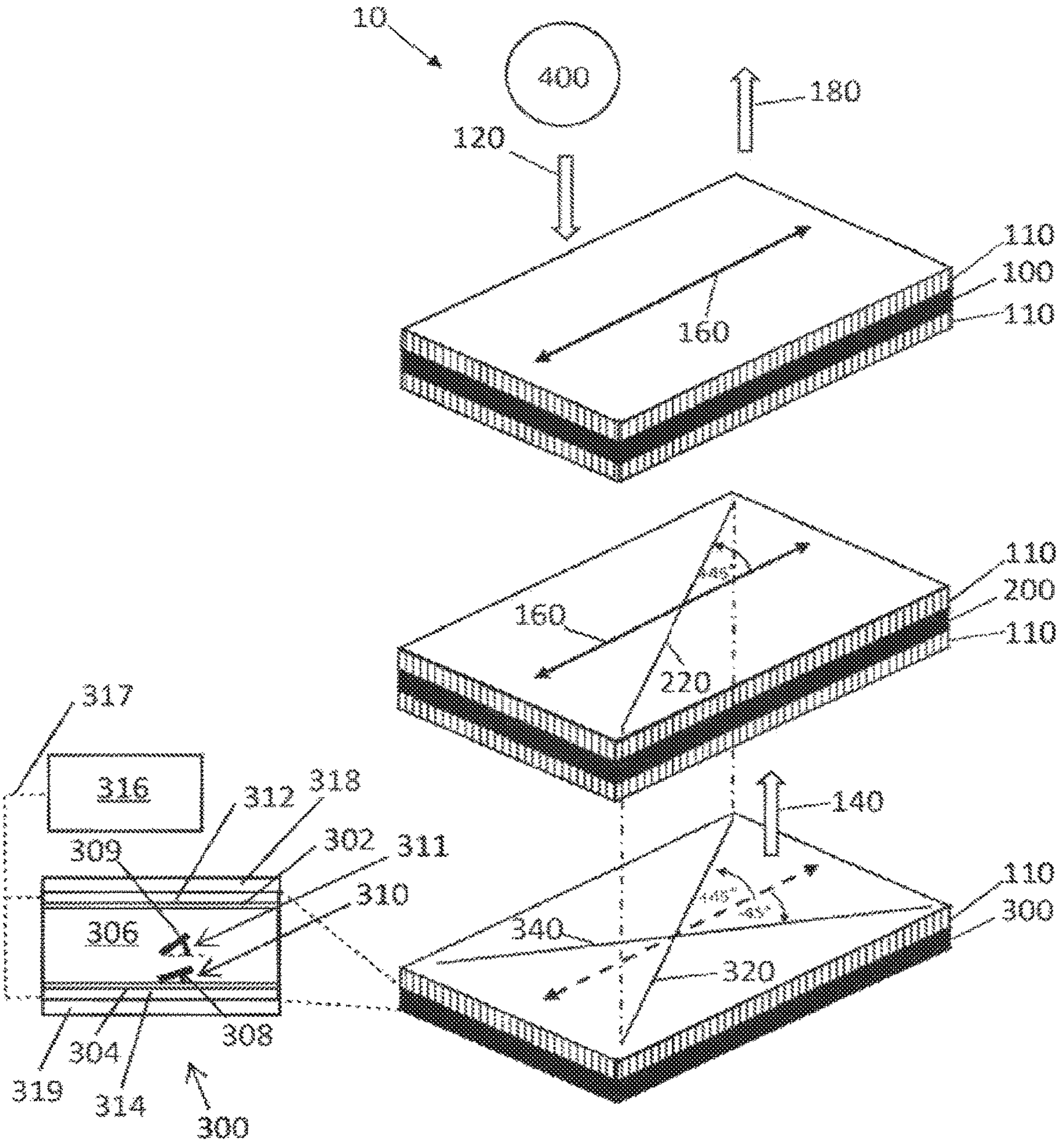
FIG. 1 is a perspective expanded schematic view of an SLM display system in accordance with the present invention.
Figure 2:
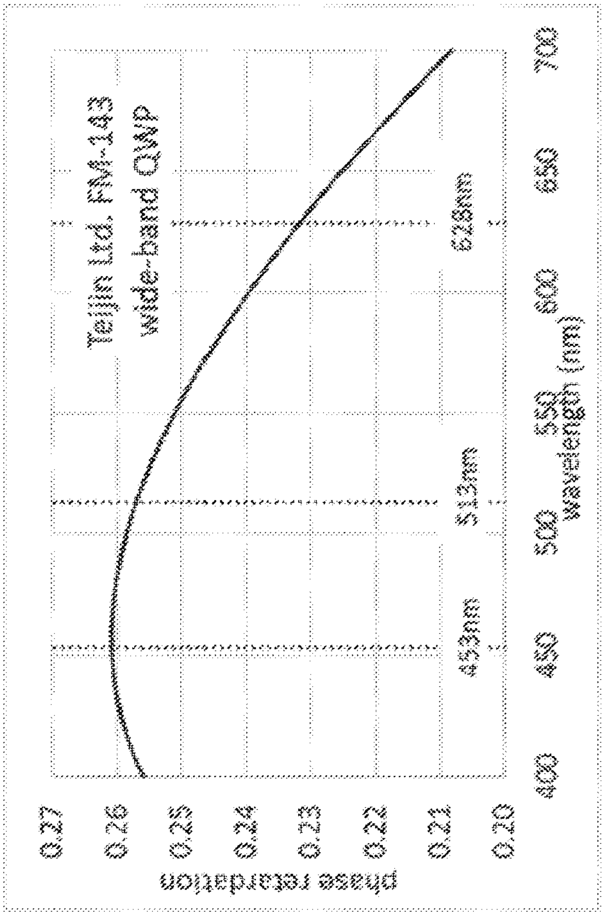
Fig. 2 (prior art)
FIG. 2 shows the wavelength dependence of the phase retardation ϕ of a prior art broadband quarter-wave plate (QWP).
Figure 3:
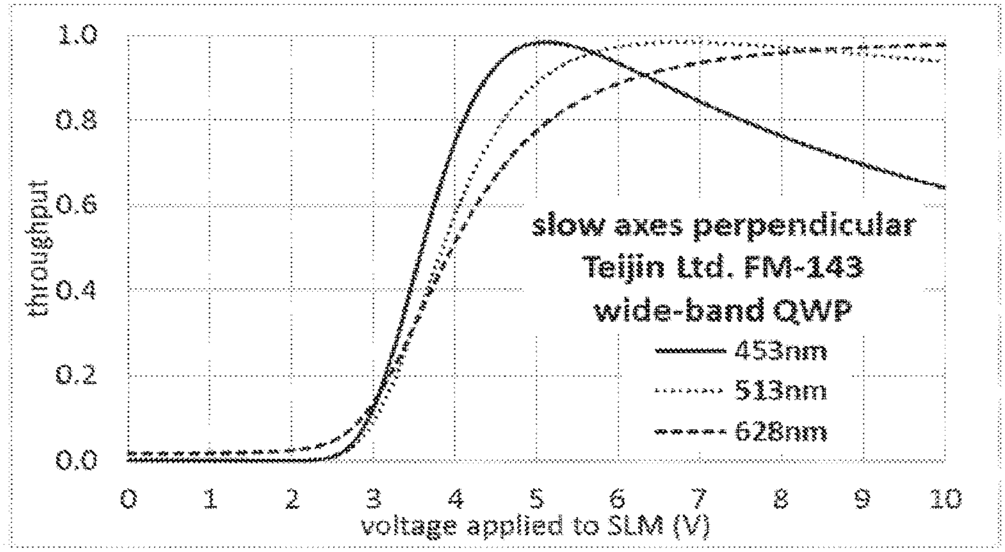
Fig. 3 (prior art)
FIG. 3 is a graph showing simulated electro-optic curves on a linear scale for the blue, green, and red wavelengths of 453 nm, 513 nm, and 628 nm using a prior art wide-band QWP with a VAN mode SLM where the slow axes of the retarder and the slow axis of the SLM are perpendicular to each other.
Figure 4:
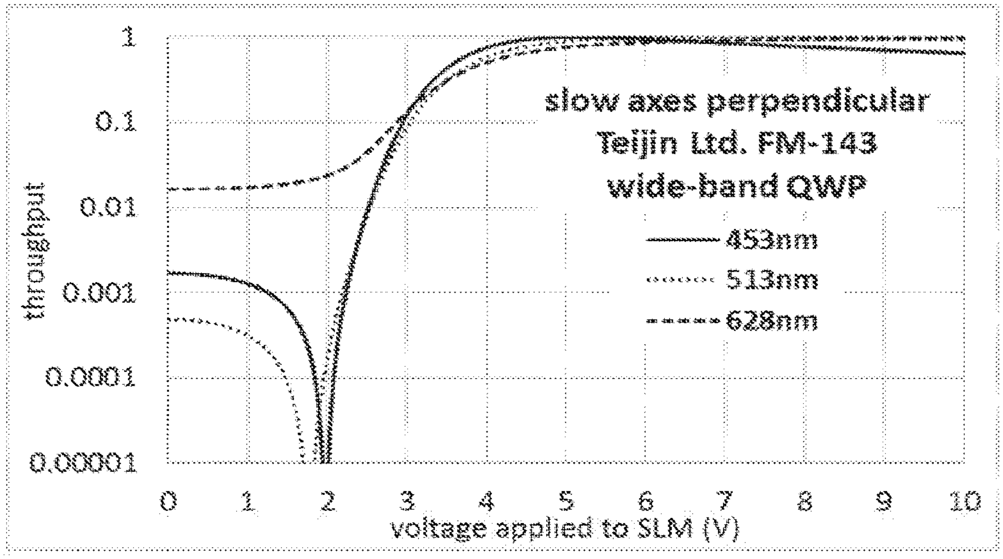
Fig. 4 (prior art)
FIG. 4 is a graph showing simulated electro-optic curves on a logarithmic scale for the blue, green, and red wavelengths of 453 nm, 513 nm, and 628 nm using a prior art wide-band QWP with a VAN mode SLM where the slow axes of the retarder and the slow axis of the SLM are perpendicular to each other.
Figure 5:
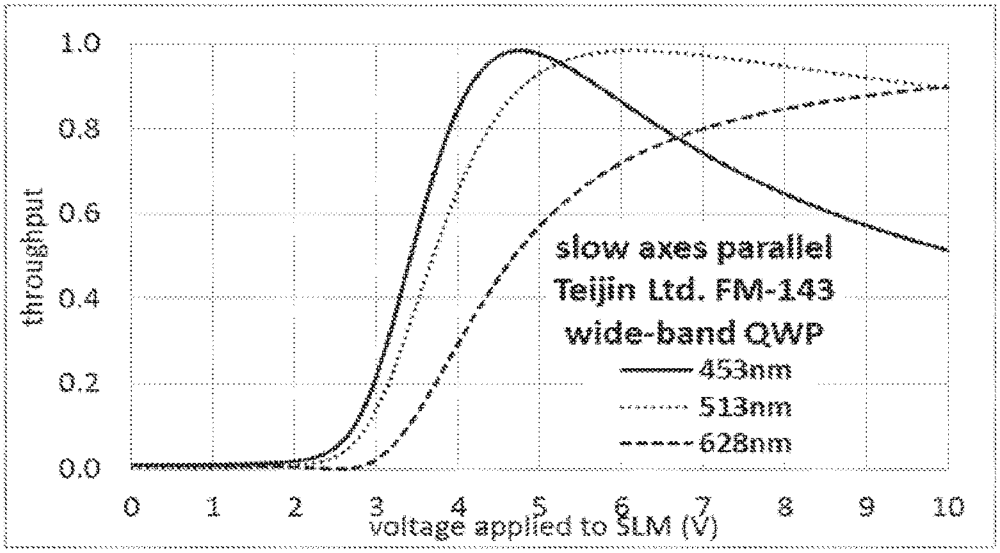
Fig. 5 (prior art)
FIG. 5 is a graph showing simulated electro-optic curves on a linear scale for the blue, green, and red wavelengths of 453 nm, 513 nm, and 628 nm using a prior art wide-band QWP with a VAN mode SLM where the slow axes of the retarder and the slow axis of the SLM are parallel to each other.
Figure 6:
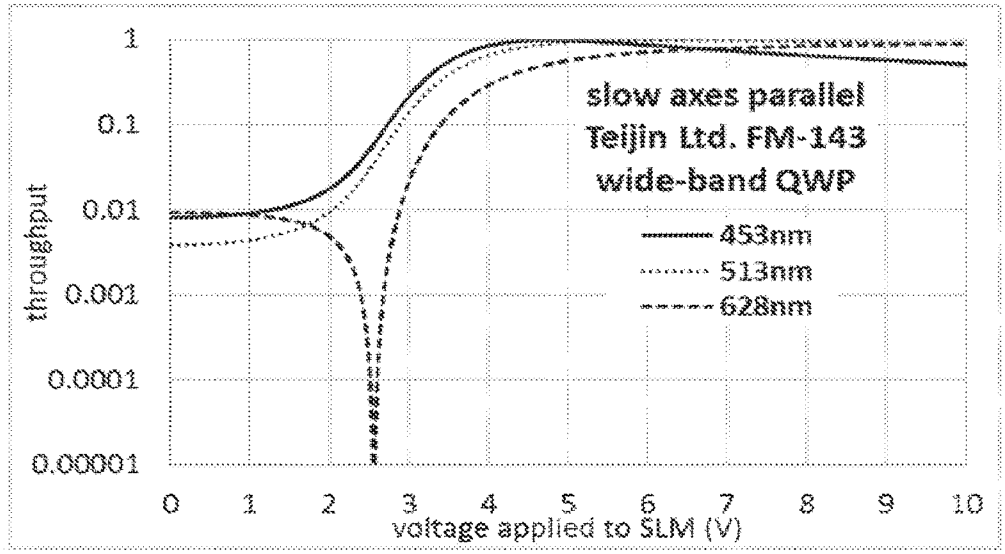
Fig. 6 (prior art)
FIG. 6 is a graph showing simulated electro-optic curves on a logarithmic scale for the blue, green, and red wavelengths of 453 nm, 513 nm, and 628 nm using a prior art wide-band QWP with a VAN mode SLM where the slow axes of the retarder and the slow axis of the SLM are parallel to each other.

FIG. 1 is a perspective expanded view of an SLM display system 10 in accordance with an embodiment of the present invention. In an embodiment of the present invention, an SLM display system 10 includes a linear polarizer 100, an external retarder 200, and a reflective SLM 300. Red, green, and blue illumination 120 from a source 400 may be directed to pixels of the SLM display system 10, such that the illumination from one or more of the light sources is received at least a portion of the pixels or all the pixels in a time sequential manner (e.g. a sequence wherein red light is directed for a period of time, and then green light may be directed for a period of time, and then blue light may be directed for a period of time). It should be understood that other sequences of these colors can be used. The illumination 120 is incident to the linear polarizer 100 and, upon passing through the linear polarizer 100, becomes linearly polarized along the polarization axis 160.

This polarized light is in turn incident onto the external retarder 200 with its in-plane slow axis 220 oriented at +45° (or substantially +45°) with the incident polarization direction or polarization axis 160. Upon passing through the retarder 200, the linear polarized light is transformed to elliptically polarized light, but not circularly polarized light, that is incident upon the SLM 300. Circularly polarized light can be generated with the angle at 45 degrees and a phase retardation of 0.25. At phase retardation other than 0.25, the light will be elliptically polarized.

In one embodiment, the orientation of an in-plane slow axis 340 of the SLM 300 is perpendicular (or substantially perpendicular) to the orientation of the slow axis 220 of the external retarder 200 and the retarder has a phase retardation value above 0.25 for all illumination wavelengths. In another embodiment, the orientation of an in-plane slow axis 320 of the SLM 300 is parallel (or substantially parallel) to the orientation of the slow axis 220 of the external retarder 200 and the retarder has a phase retardation value below 0.25 for all illumination wavelengths.

Reflected light 140 from the SLM 300 makes a second pass in the opposite direction back through the external retarder 200 and the polarizer 100 where the reflected light 180 emerges or exits to be detected, for example, by the eye or other detector. The intensity of the reflected light 180 depends upon a voltage applied to the individual pixels of the SLM 300.

In particular, referring to FIG. 1, the SLM 300 includes a first alignment layer 302, a second alignment layer 304, and a liquid crystal material layer 306 between the first alignment layer 302 and the second alignment layer 304. The liquid crystal layer 306 includes surface-contacting liquid crystal directors 308 on the first alignment layer 302 and the second alignment layer 304, and non-surface-contacting liquid crystal (LC) directors 309 in the bulk of the liquid crystal layer 306. The surface-contacting directors 308 have azimuthal alignment directions, for example, according to preconditioned directions of alignment layers 302, 304. For example, the preconditioned directions can be generated by material deposited on the surface from an oblique direction, photosensitive material on the surface illuminated by obliquely incident, polarized UV light, or unidirectionally rubbing the surface with a velvet-like cloth.

In VAN mode, the slow axis of the SLM 300 is parallel to the azimuthal alignment directions (e.g., 45 degrees) of the surface-contacting LC directors 308. In TVAN mode, the slow axis of the SLM 300 is parallel to a line that bisects the azimuthal alignment directions (e.g., 0 and 90 degrees) of the surface-contacting directors 308. For illustration purposes, only one surface-contacting LC director is shown on the lower alignment layer 304, although the liquid crystal layer includes a plurality of surface-contacting LC directors on each of the lower alignment layer 304 and the upper alignment layer 302. Similarly, the bulk (e.g., the inner or middle apart from the alignment layers 302, 304) of the liquid crystal layer 306 includes a plurality of directors throughout the thickness of the liquid crystal layer 306.

In addition, the surface-contacting LC directors 308 are characterized by a pretilt angle 310. The pretilt angle 310 and the tilt angles 311 of the directors 309 in the bulk of the liquid crystal layer 306 determine the retardation Γ of the SLM 300. According to an exemplary embodiment, the liquid crystal material 306 has a negative dielectric anisotropy.

In addition, the SLM 300 includes a plurality of pixel electrodes including a first electrode 312 and a second electrode 314 that are connected to a voltage source 316. The voltage source 316 is configured to supply a voltage 317 to the electrodes 312, 314 and thereby apply a voltage 317 across the liquid crystal layer 306 of individual pixels of the second electrode 314 of the SLM 300. The voltage 317 through the liquid crystal layer 306 changes the tilt angles 311 of the directors 309 in the bulk of the liquid crystal layer 306 and thereby changes the overall retardation Γ of the SLM 300. The voltage source 316 stores predetermined voltages or otherwise generates voltages that are associated with dark-states and bright-states for each wavelength and pixel.

The SLM 300 further includes substrate layers 318, 319 outside the electrodes 312, 314. In particular, the substrate layer 318 is above the electrode 312 and the substrate layer 319 is below the electrode 314.

As described in further detail below, the electro-optic curves for individual pixels are operable by non-zero wavelength dependent drive voltages 317. An off-state or dark-state wavelength-dependent drive voltage 317 is determined for each wavelength to be the voltage where the electro optical curve of throughput for that wavelength has a minimum, near-zero (e.g., less than 0.001) throughput value. On-state or bright-state wavelength-dependent pixel drive voltages 317 that are higher than the off-state wavelength-dependent drive voltages are applied to individual pixels to increase pixel throughput and provide gray levels.

Accordingly, for an illumination wavelength received from the light source 400, each pixel is controlled with an on-state wavelength dependent drive voltage 317 or an off-state wavelength dependent drive voltage 317 corresponding to the illumination wavelength.

It will be obvious to those having skill in the art that the polarizer 100, retarder 200 and the SLM 300 (for example, an LCoS SLM illustrated in FIG. 1) are just one example of an optical configuration in accordance with the present invention. For example, the slow axis 220 of the external retarder 200 may also be oriented at −45° (or substantially −45°) with the incident polarization direction or polarization axis 160. To suppress front-surface reflections from the illumination source 400 which may cause or contribute to a lower contrast ratio, the polarizer 100 and retarder 200 may have anti-reflective coatings 110 deposited on one or both sides, and the SLM 300 may have an anti-reflective coating 110 on the top surface of substrate layer 318 of the SLM 300. Alternatively, two of the elements 100, 200, and 300 (or even all three of these elements) may be optically coupled, for example, laminated together, to reduce reflections at the interfaces.

For clarity, associated optical elements including lenses, prisms, and mirrors are not shown in FIG. 1. Red, green, and blue illumination source 400 or sources utilized for full color operation, according to an embodiment of the present invention, may include solid-state full-color diodes, light-emitting diodes (e.g., organic light-emitting diodes), solid-state lasers and gas lasers, and/or other sources of electromagnetic radiation such as filtered light coming from Xenon, metal halide, or tungsten halogen lamps. If the light sources are already linearly polarized, as might be the case for some gas lasers and solid-state laser diodes, then the polarizer in the incident illumination path could be obviated while retaining a polarizer in the reflection path. In the embodiment when the polarizer in the incident illumination path is obviated while retaining a polarizer in the reflection path, the polarization direction of the polarizer in the reflection path is parallel or substantially parallel to the polarization direction of the incident light source.

External Retarder—Selection of Retardance

As described below, an external retarder with a selected retardance can improve the performance of the SLM display system. Selection of retardance of the external retarder is discussed with reference to FIG. 7.

Figure 7:
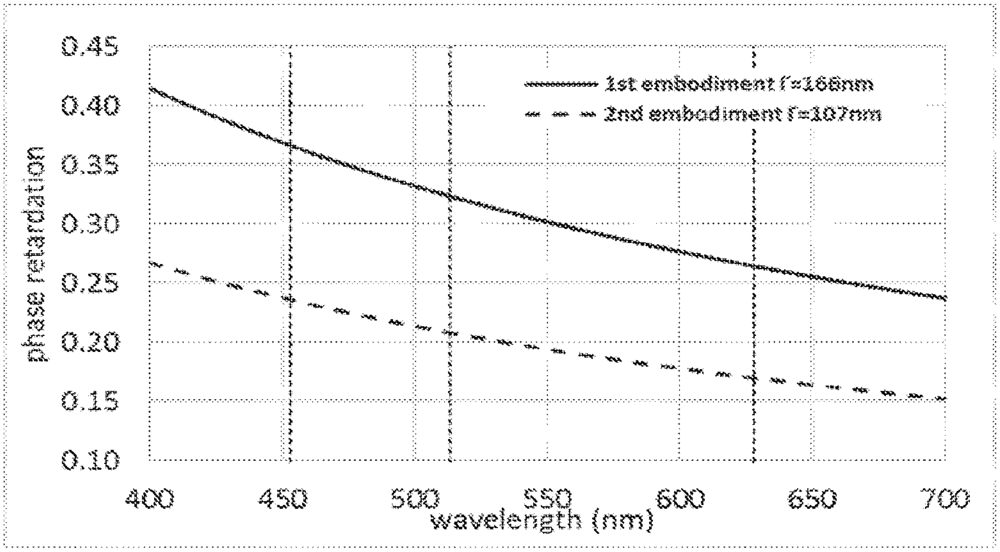
FIG. 7 shows the wavelength dependence of the phase retardation of a 166 nm retarder according to an exemplary embodiment of the present invention and the wavelength dependence of the phase retardation of a 107 nm retarder according to an exemplary embodiment of the present invention.

FIG. 7 shows the wavelength dependence of the phase retardation $\phi$ of a 166 nm external retarder 200 in an embodiment in accordance with the present invention and the wavelength dependence of the phase retardation of a 107 nm external retarder 200 used in another embodiment in accordance with the present invention.

Phase retardation $\phi$ is a dimensionless quantity that characterizes the phase shift between the fast and slow rays of light that have propagated through a birefringent layer or combination of birefringent layers and is defined by the retardation $\Gamma$ divided by the illumination wavelength $\lambda$ (i.e., $\phi=\Gamma/\lambda$). The retardation $\Gamma$ is the distance between the wavefronts of the fast ray and the slow ray of incident polarized light after passing through a birefringent material or combination of birefringent materials.

In an embodiment, the external retarder 200 has a retardation $\Gamma$ value that is greater than one-fourth of the longest wavelength of electromagnetic radiation (e.g., light) transmitted to the SLM 300 illumination (and, for example, less than or equal to 175 nm). For example, if the longest illumination wavelength is the red wavelength of 628 nm, then the retardation $\Gamma$ of the external retarder 200 at that wavelength should be greater than 628/4 nm, which is 157 nm. This is illustrated by the example shown in FIG. 7, corresponding to an embodiment of the present invention, where the retardation $\Gamma$ accomplished by the external retarder 200 is 166 nm and the longest wavelength received by the external retarder 200 is the red wavelength of 628 nm. For example, the retardation $\Gamma$ value is in a range of one-fourth of the longest wavelength to 175 nm. In FIG. 7, for the external retarder 200 with a retardation $\Gamma$ value of 166 nm, the phase retardation $\phi$ is greater than 0.25 for each of the wavelengths of 453 nm, 513 nm, and 628 nm It should be understood by one of ordinary skill in the art that the wavelength and retardation can be alternatively selected such that the retardation $\Gamma$ of the external retarder 200 has a phase retardation $\phi$ that is greater than 0.25 for each of at least three wavelengths of three different colors. For example, the retardation $\Gamma$ of the external retarder 200 is selected according to a longest wavelength to be produced by the light source 400 as described above.

In another embodiment, the external retarder 200 has a retardation $\Gamma$ value that is less than one-fourth of the shortest wavelength used for the display illumination (and, for example, greater than or equal to 100 nm). For example, if the shortest illumination wavelength is the blue wavelength of 453 nm then the retardation $\Gamma$ of the external retarder 200 should be less than 453/4 nm, which is 113.25 nm. This is illustrated by the example shown in FIG. 7 where the retardation accomplished by the external retarder 200 is 107 nm and the shortest wavelength is the blue wavelength of 453 nm. For example, the retardation $\Gamma$ value is in a range of 100 nm to one-fourth of the shortest wavelength. In FIG. 7, for the external retarder 200 with a retardation $\Gamma$ value of 107 nm, the phase retardation $\phi$ is less than 0.25 for each of the wavelengths of 453 nm, 513 nm, and 628 nm It should be understood by one of ordinary skill in the art that the wavelength and retardation can be alternatively selected such that the retardation $\Gamma$ of the external retarder 200 has a phase retardation $\phi$ that is less than 0.25 for each of at least three wavelengths of three different colors. For example, the retardation $\Gamma$ of the external retarder 200 is selected according to a shortest wavelength to be produced by the light source 400 as described above.

Table 1 below lists the phase retardation $\phi$ at three wavelengths for the examples of embodiments of the present invention. For example, one embodiment of the present invention incorporates an external retarder 200 with a retardation $\Gamma$ of 166 nm and another embodiment incorporates an external retarder 200 with a retardation $\Gamma$ of 107 nm. It should be noted that the phase retardation $\phi$ is greater than 0.25 for all three wavelengths $\lambda$ in the embodiment that incorporates an external retarder 200 with a retardation $\Gamma$ of 166 nm and less than 0.25 for all three wavelengths in the embodiment that incorporates an external retarder 200 with a retardation $\Gamma$ of 107 nm.

TABLE 1

| | Γ = 166 mm | | Γ = 107 nm | |
|---|---|---|---|---|
| λ | φ | Δφ | Φ | Δφ |
| 453 nm | 0.367 | 0.117 | 0.236 | −0.014 |
| 513 nm | 0.323 | 0.073 | 0.209 | −0.041 |
| 628 nm | 0.264 | 0.014 | 0.171 | −0.079 |

In the embodiment of the present invention reflected in Table 1 above, blue, green, and red wavelengths are chosen to be 453 nm, 513 nm, and 628 nm, respectively. It will be obvious to those having skill in the art that other wavelengths having blue, green, and red colors could also be used and other colors including, but not limited to, yellow could be added to increase the color gamut of a full-color display.

A difference in phase retardation $\Delta\phi$ is the difference between the phase retardation $\phi$ of the combination of the external retarder 200 and a phase retardation $\phi$0 of 0.25 (i.e., light is circularly polarized at a phase retardation $\phi$ of 0.25). The difference in phase retardation $\Delta\phi$ is positive in the embodiment where the retardation $\Gamma$ of the external retarder 200 is 166 nm and negative in the embodiment where the retardation $\Gamma$ of the external retarder 200 is 107 nm. In an embodiment of the present invention, an SLM (e.g., a display, in accordance with the present invention, achieves high contrast ratios of two thousand (2000) or greater, for all wavelengths, for example, three wavelengths, when the magnitude of the difference in phase retardation $\Delta\phi$ (that is, $|\Delta\phi|$) is equal to or larger than 0.01 for all three wavelengths, as this value for $|\Delta\phi|$ achieves or ensures that the phase retardation is either above 0.25 at all wavelengths for the case of the 166 nm external retarder 200 or below 0.25 at all three wavelengths for the case of the 107 nm external retarder 200.

Improved Performance of a SLM Display System—Minimum Throughput in EO Curve

Using an external retarder with a retardance that is selected as described above in a SLM display device results in improved performance of the SLM display system, which can be demonstrated by looking at EO curves of the SLM display system. The EO curves show the throughput of the SLM display system 10 for a wavelength from the light source 400 as a function of voltage applied by the voltage source 316. Contrast ratio is defined as the ratio of the maximum throughput of the EO curve divided by the throughput of the EO curve at the near-zero (e.g., less than 0.001) throughput minimum in the EO curve.

Simulations may be carried out using commercial software packages, such as LCDBench Version 6.42 and Analyzer Version 6.60, both available from Shintech, Tokyo, Japan. In an embodiment of the present invention, an SLM has a cell gap (i.e., the distance between the surfaces of first and second alignment layers 302 and 304 facing the liquid crystal layer 306 pixels) is 0.9 μm; the liquid crystal birefringence $\Delta n$ is 0.2206 at 453 nm, 0.2016 at 513 nm, and 0.1859 at 628 nm; the pretilt angle is 84°; the light is normally incident; and the reflector and the polarizer are ideal.

For all the simulations used in the present disclosure, including those shown in the simulated EO curves of FIGS. 3, 4, 5, and 6 for the relevant art, the LCoS cell gap is 0.9 μm, and the liquid crystal birefringence $\Delta n$ is 0.2206 at 453 nm, 0.2016 at 513 nm, and 0.1859 at 628 nm. The pretilt angle (i.e. the angle 310 that the surface contacting directors 308 of the liquid crystal layer 306 inside the SLM 300 makes with the plane of the SLM 300) is 84° measured from the plane of the SLM 300. The simulations are carried out with normally incident light assuming an ideal 100% reflector and an ideal polarizer 100. One having skill in the art will recognize that this is only one of the many examples that could have been chosen to represent the present invention. For example, in embodiments of the present invention, cell gaps may vary between, and including, 0.5 μm and 3.0 μm, depending upon the refractive indices of the liquid crystal used; and the pretilt angle limitations may vary between and including 89° and 75°.

Figure 8:
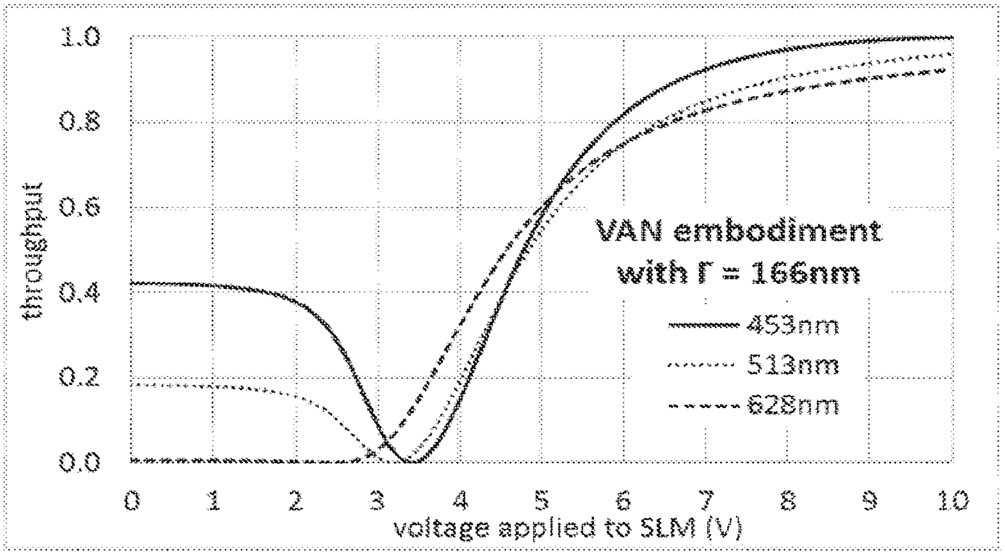
FIG. 8 is a graph showing simulated electro-optic curves on a linear scale for the blue, green, and red wavelengths of 453 nm, 513 nm, and 628 nm according to an exemplary embodiment of the present invention with a VAN mode SLM using a 166 nm retarder.
Figure 9:
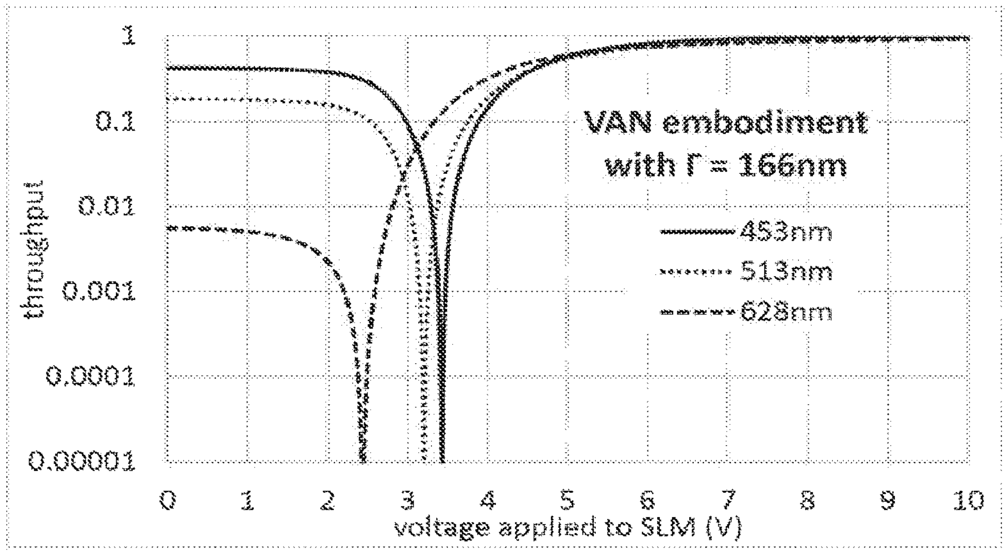
FIG. 9 is a graph showing simulated electro-optic curves on a logarithmic scale for the blue, green, and red wavelengths of 453 nm, 513 nm, and 628 nm according to an exemplary embodiment of the present invention with a VAN mode SLM using a 166 nm retarder.

FIGS. 8 and 9 show simulated electro-optic (EO) curves on linear and logarithmic scales for blue, green and red wavelength examples of 453 nm, 513 nm, and 628 nm of an embodiment in accordance with the present invention, when the external retarder 200 has a retardation $\Gamma$ of 166 nm with its slow axis 220 oriented perpendicular to the slow axis 340 of the VAN mode SLM 300.

The logarithmic scale of FIG. 9 shows near-zero throughput minimums amounting to less than 0.00001 in the EO curve of an exemplary embodiment of the SLM display system 10 for all three colors. These near-zero throughput minimums below 0.001 for all illumination colors are achieved by the present invention, as the present invention employs, for example, a retarder 200 with a retardation $\Gamma$ of 166 nm as described above, and are not present in prior art schemes using external broadband QWPs (e.g., see FIGS. 4 and 6 which show only some throughput minimums below 0.001).

Figure 10:
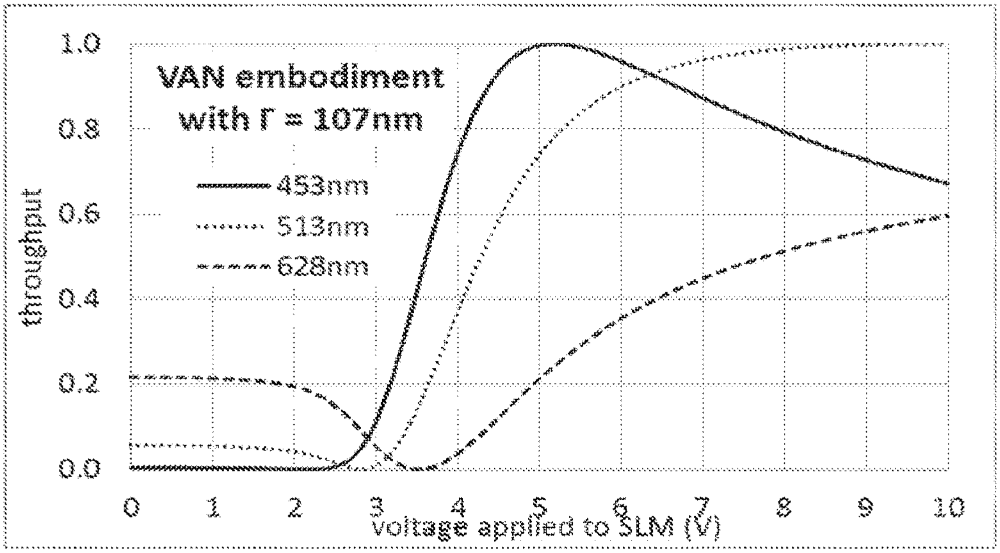
FIG. 10 is a graph showing simulated electro-optic curves on a linear scale for the blue, green, and red wavelengths of 453 nm, 513 nm, and 628 nm according to an exemplary embodiment of the present invention with a VAN mode SLM using a 107 nm retarder.
Figure 11:
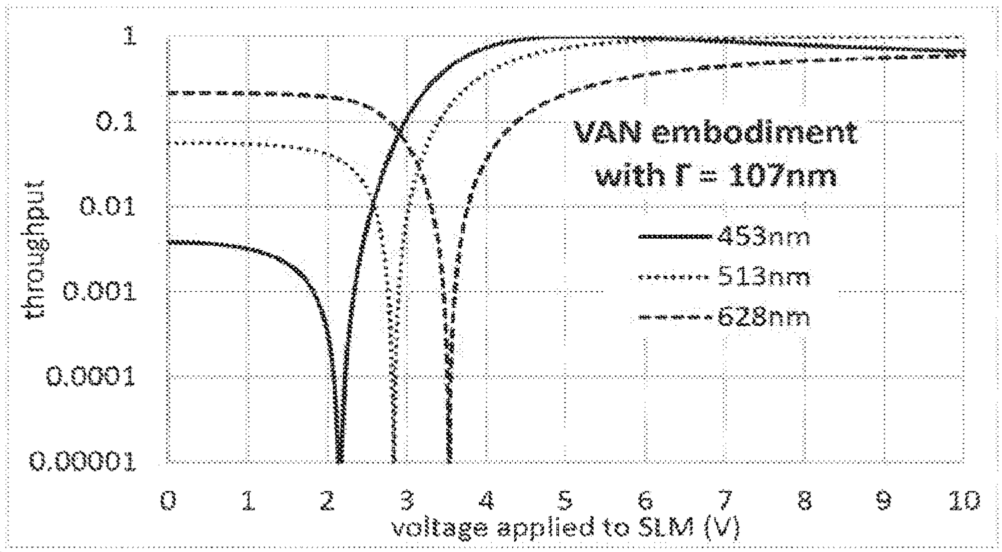
FIG. 11 is a graph showing simulated electro-optic curves on a logarithmic scale for the blue, green, and red wavelengths of 453 nm, 513 nm, and 628 nm according to an exemplary embodiment of the present invention with a VAN mode SLM using a 107 nm retarder.

FIGS. 10 and 11 show simulated electro-optic (EO) curves on linear and logarithmic scales of an embodiment of an SLM display system 10, in accordance with the present invention, that includes an external retarder 200 having a retardation $\Gamma$ of 107 nm with its slow axis 220 oriented parallel to the slow axis 320 of a VAN mode SLM 300.

The logarithmic scale of FIG. 11 shows near-zero throughput minimums of the EO curve for an exemplary SLM display system 10, in accordance with the present invention, amounting to less than 0.00001 in the EO curve for all three colors (i.e., red, blue, and green). These near-zero throughput minimums of 0.001 or less for all illumination colors are characteristic of the present invention and are not present in prior art schemes using external broadband QWPs.

Figure 12:
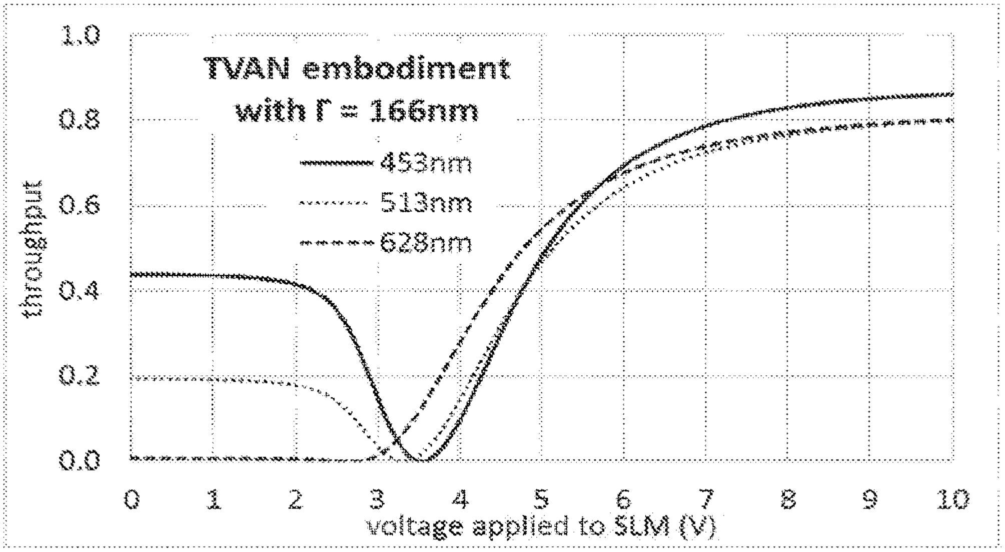
FIG. 12 is a graph showing simulated electro-optic curves on a linear scale for the blue, green, and red wavelengths of 453 nm, 513 nm, and 628 nm according to an exemplary embodiment of the present invention using a 166 nm retarder with a 90° twisted TVAN mode SLM.
Figure 13:
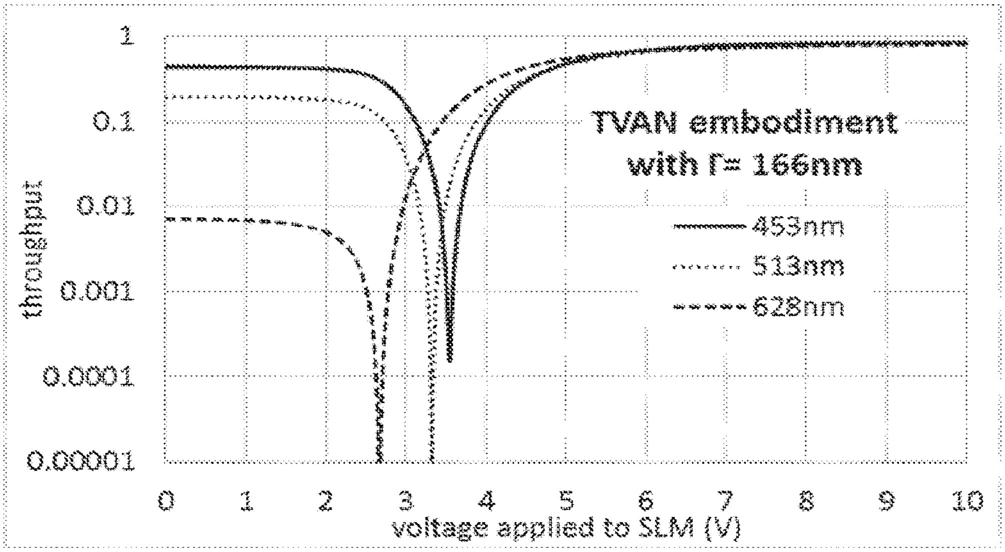
FIG. 13 is a graph showing simulated electro-optic curves on a logarithmic scale for the blue, green, and red wavelengths of 453 nm, 513 nm, and 628 nm according to an exemplary embodiment of the present invention using a 166 nm retarder in a 90° twisted TVAN mode SLM.

FIGS. 12 and 13 show simulated electro-optic (ED) curves on linear and logarithmic scales of an embodiment in accordance with the present invention where the external retarder 200 has a retardation $\Gamma$ of 166 nm with its slow axis 220 oriented perpendicular to the slow axis 340 of a 90° twisted TVAN mode SLM 300. For the computer simulations, the slow axis 340 of the TVAN mode is parallel to the bisector of the azimuthal alignment directions on the alignment layers 302, 304 of the SLM 300.

The logarithmic scale of FIG. 13 shows near zero throughput minimums amounting to less than 0.00014 in the EO curves for all three colors. These throughput minimums for all illumination colors are characteristic of the present invention and are not present in prior art schemes using external broadband QWPs.

Figure 14:
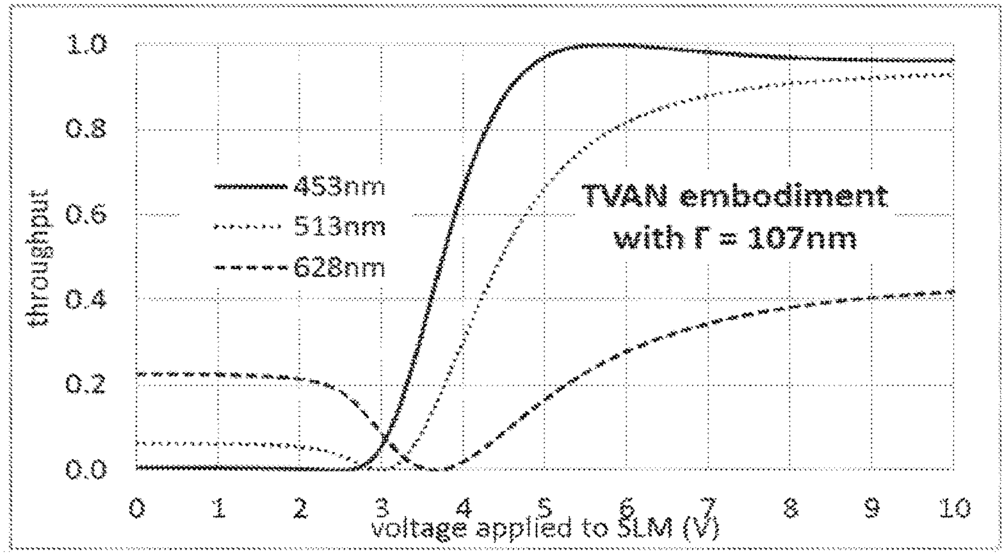
FIG. 14 is a graph showing simulated electro-optic curves on a linear scale for the blue, green, and red wavelengths of 453 nm, 513 nm, and 628 nm according to an exemplary embodiment of the present invention using a 107 nm retarder in a 90° twisted TVAN mode SLM.
Figure 15:
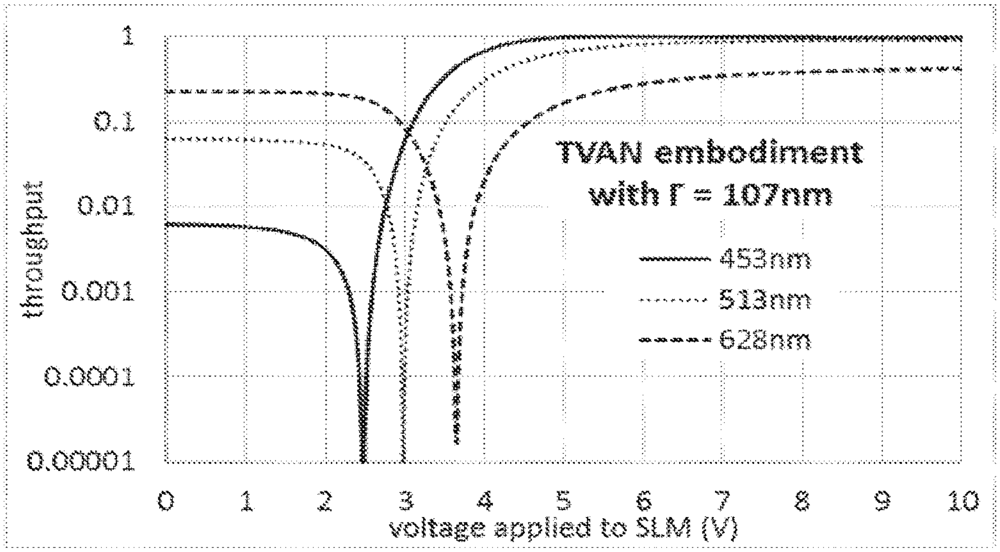
FIG. 15 is a graph showing simulated electro-optic curves on a logarithmic scale for the blue, green, and red wavelengths of 453 nm, 513 nm, and 628 nm according to an exemplary embodiment of the present invention using a 107 nm retarder in a 90° twisted TVAN mode SLM.

FIGS. 14 and 15 show simulated electro-optic (EO) curves on linear and logarithmic scales of a TVAN embodiment, in accordance with the present invention, where the external retarder 200 has a retardation $\Gamma$ of 107 nm with its slow axis 220 oriented parallel to the slow axis 320 of a TVAN mode SLM 300.

The logarithmic scale of FIG. 15 shows near-zero throughput minimums amounting to less than 0.0001 in the EO curve for all three colors. These near-zero throughput minimums for all illumination colors are characteristic of the present invention and are not present in prior art schemes using external broadband QWPs.

Drive Voltages for Dark States and Bright States

In an embodiment, the liquid crystal display 10 may be operable by the drive voltage 317 to maintain individual pixels of the liquid crystal display 10 in an off-state for each illumination wavelength. The liquid crystal display 10 is in the off-state at a voltage where a zero or near-zero throughput minimum is present in an electro-optical curve for each illumination wavelength.

The liquid crystal display 10 is also operable and/or operates by a drive voltage 318 to maintain the individual pixels of the liquid crystal display 10 in an ON state for each illumination wavelength. The liquid crystal display is in the ON state at voltages above the OFF state voltage. In the embodiments of the present invention, the throughput minimums in the EO curves occur at voltages where the combined phase retardation $\phi$ is 0.25. The combination of the retardation of the external retarder and the retardation of the SLM creates circular polarization at the voltage of the near-zero throughput minimum. This occurs at different voltages for each of the illumination wavelengths. In contrast, the external retarder with the selected retardance described above creates elliptical polarization at the wavelengths used to determine the selected retardance.

In the embodiments of the present invention of FIGS. 11 and 15, the retardation Γ of the liquid crystal layer 306 is added to the retardation Γ of the external retarder 200 to achieve the combined phase retardation ϕ of 0.25. To achieve contrast ratios greater than 2000 for a given color, an SLM, in accordance with the present invention, for example, an LCoS SLM, is driven with a pixel drive voltage 317. The pixel drive voltage 317 is at or near the voltage where the near-zero throughput minimum occurs in the electro-optic curve, of the LCoS SLM in accordance with the present invention, to achieve a dark pixel (e.g., an off state).

In an embodiment of the present invention, the pixel drive voltage 317 is increased above the off-state voltage to achieve pixel gray levels of increased brightness. In embodiments of the present invention of FIGS. 9 and 13, the retardation Γ of the liquid crystal layer 306 is subtracted from the retardation Γ of the external retarder 200 to result in the combined phase retardation ϕ of 0.25. To achieve contrast ratios greater than or equal to 2000 for a given color, the LCoS display 10 is driven with a pixel drive voltage 317. The pixel drive voltage 317 is at or near the voltage where the near-zero throughput minimum occurs in the electro-optic curve corresponding to the electro-optical performance of an SLM, in accordance with the present invention, to achieve a dark pixel (i.e., an off state). The pixel drive voltage 317 is increased above this off-state voltage to achieve pixel gray levels of increased brightness (i.e., an on state).

External Retarder with Constant Phase Retardation

The embodiments of the invention described above include external retarders 200 having separate retardations Γ of 166 nm and 107 nm. For the simulations these retardations Γ are assumed to be wavelength independent, which would be closely approximated by a retarder 200 made from polyvinyl alcohol. However, the phase retardation ϕ of these retarders is wavelength-dependent as shown in FIG. 7. This is because phase retardation ϕ is given as $\phi=\Gamma/\lambda$. Because retardation Γ is a constant, phase retardation ϕ is a function of wavelength.

Figure 16:
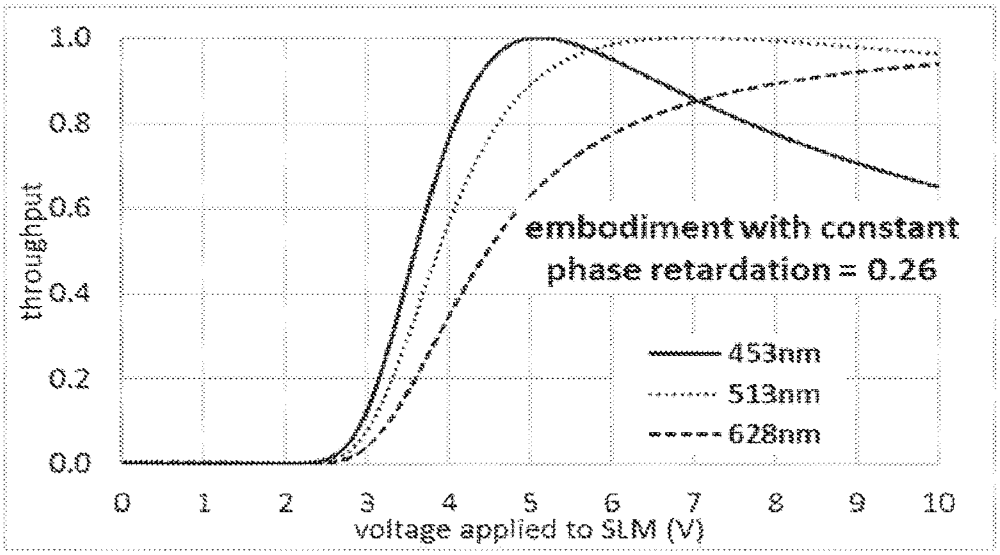
FIG. 16 is a graph showing simulated electro-optic curves on a linear scale for the blue, green, and red wavelengths of 453 nm, 513 nm, and 628 nm according to an exemplary embodiment of the present invention using a retarder with constant phase retardation ϕ of 0.26 in a VAN mode SLM.
Figure 17:
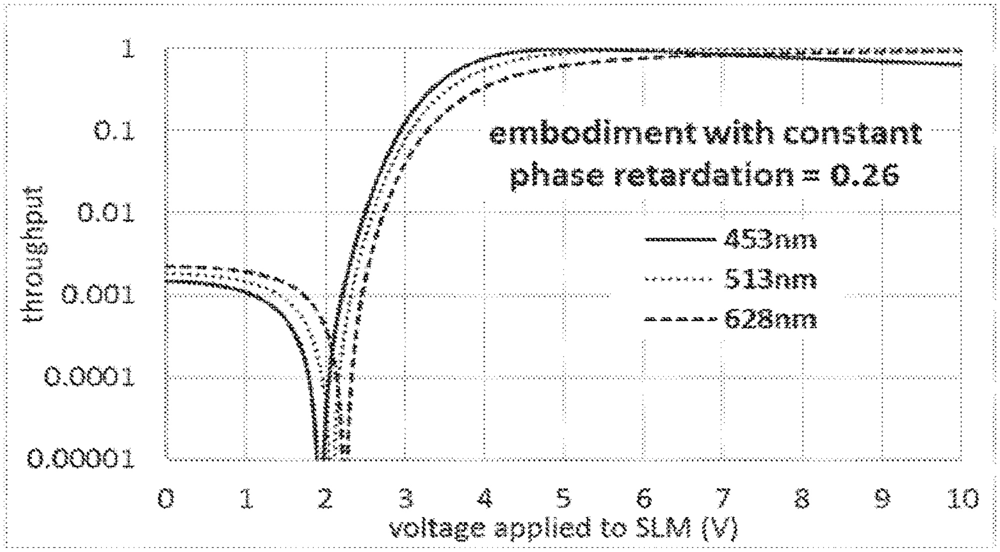
FIG. 17 is a graph showing simulated electro-optic curves on a logarithmic scale for the blue, green, and red wavelengths of 453 nm, 513 nm, and 628 nm according to an exemplary embodiment of the present invention using a retarder with constant phase retardation ϕ of 0.26 in a VAN mode SLM.

FIGS. 16 and 17 show simulated electro-optic (EO) curves on linear and logarithmic scales of an embodiment in accordance with the present invention where the external retarder 200 has constant phase retardation ϕ of 0.26 with its slow axis 220 oriented perpendicular to the slow axis 340 of the VAN mode SLM 300. The logarithmic scale of FIG. 17 shows near-zero throughput minimums amounting to less than 0.0001 in the EO curve for all three colors. In an embodiment, contrast ratios greater than 2000 can be achieved for a given color by driving the SLM 300 with a pixel drive voltage 317. The pixel drive voltage 317 is set at or near the voltage where the near-zero throughput minimum occurs in the electro-optic curve to achieve a dark pixel. The pixel drive voltage 317 is increased above this us to achieve pixel gray levels of increased brightness.

Comparing the EO curves in FIG. 8 (for the embodiment in accordance with the present invention using a retarder 200 with retardation Γ of 166 nm) with the corresponding EO curves of FIG. 16 (for an embodiment in accordance with the present invention using a retarder 200 with a constant phase retardation ϕ of 0.26 and the slow axis 220 of the retarder 200 being perpendicular with the SLM slow axis 340) shows the EO curves for the blue and green wavelengths to be steeper and to achieve higher throughput at drive voltages 317 above where the EO curves have near-zero minimums. An external retarder 200 with constant phase retardation ϕ may be preferred over an external retarder with constant retardance Γ, especially in cases where the drive voltage is limited to lower values by the design of the SLM's 300 pixel circuitry;

Similarly, simulations of an embodiment example using a retarder 200 with a constant phase retardation ϕ of 0.24 and parallel orientation of its slow axis 220 with the SLM slow axis 320 shows EO curves that are virtually identical to those of FIGS. 16 and 17.

The phase retardation ϕ used in these examples does not have to be perfectly constant in order to achieve steep EO curves with high throughput. Such a retarder 200, in accordance with the present invention, with nearly constant phase retardation of 0.26 in accordance with the present invention, for example, combines three external retarders of different retardances Γ and orientation angles in a manner similar to that taught by S. Pancharatnam, Part I and Part II, in The Proceedings of the Indian Academy of Sciences, Vol. XLI, No. 4, Sec. A, pages 130-144, 1955.

Method

Figure 18:
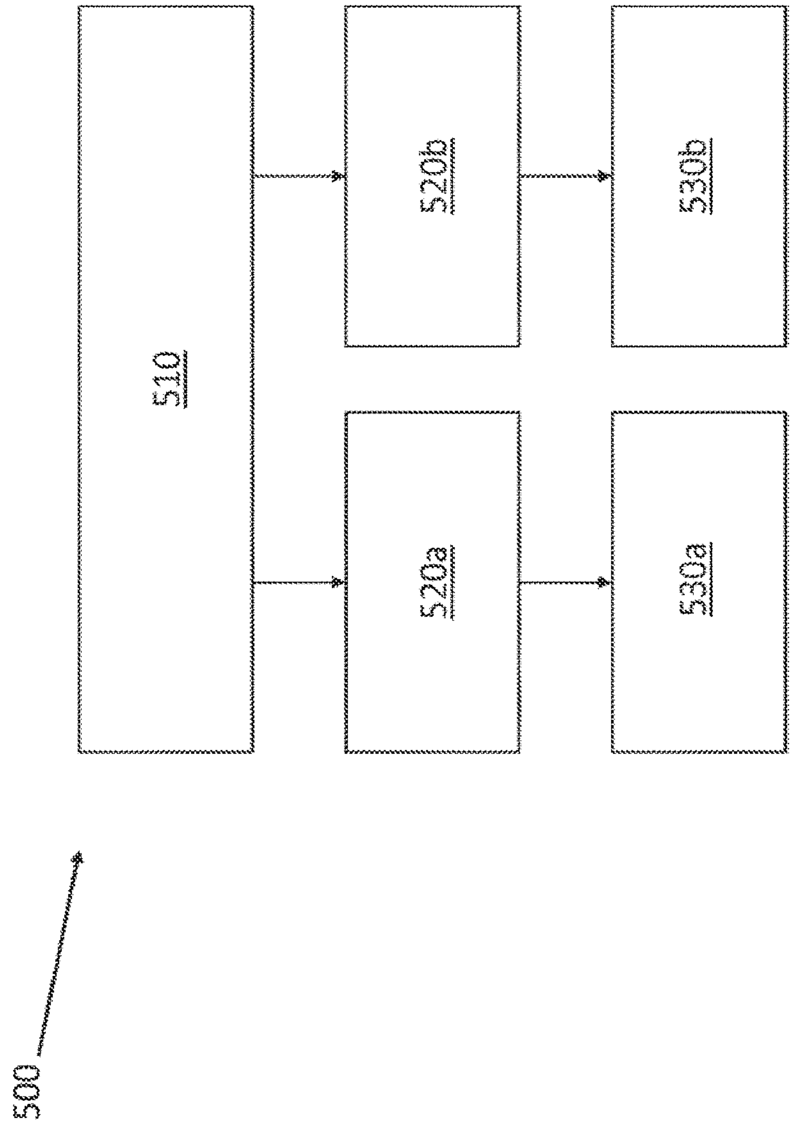
FIG. 18 is a flow chart illustrating an exemplary method of forming a display system according to an exemplary embodiment of the present invention.

Referring to FIG. 18, an exemplary method 500 is described according to an exemplary embodiment of the present invention. According to a first step 510, a set of illumination wavelengths 510 is determined. The set of illumination wavelengths includes at least one illumination wavelength in each of at least three different color spectrums. For example, at least one illumination wavelength is determined from each of a 625-740 nm wavelength band for red, a 500-565 nm wavelength band for green, and a 450-485 nm wavelength band for blue.

According to a second step 520*a*, an external retarder having a retardance is selected with respect to a minimum retardance. The retardance is such that the phase retardation is greater than 0.25 for each of the wavelengths in the set of illumination wavelengths. In particular, the minimum retardance is calculated as one-fourth of the longest wavelength (e.g., of a wavelength from the red band in the example above).

According to a third step 530*a*, the slow axis of the external retarder with the selected retardance is oriented with respect to the slow axis of the SLM. The slow axis of the retarder is oriented to be perpendicular to the slow axis of the SLM.

As an alternative, following the first step 510, according to a second step 520*b*, an external retarder having a retardance is selected with respect to a maximum retardance. The retardance is such that the phase retardation is less than 0.25 for each of the wavelengths in the set of illumination wavelengths. In particular, the maximum retardance is calculated as one-fourth of the shortest wavelength (e.g., of a wavelength from the blue band in the example above).

According to a third step 530*b*, the slow axis of the external retarder with the selected retardance is oriented with respect to the slow axis of the SLM. The slow axis of the retarder is oriented to be parallel to the slow axis of the SLM.

The above-described embodiments are merely exemplary illustrations of implementations that are set forth for a clear understanding of principles. Variations, modifications, and combinations may be made to the above-described embodiments without departing from the scope of the claims. All such variations, modifications, and combinations are included herein by the scope of this disclosure and the following claims.

What is claimed is:

1. A method, comprising:

determining a set of illumination wavelengths, wherein the set of illumination wavelengths includes at least one illumination wavelength in each of at least three different color spectrums;

selecting a liquid crystal on silicon (LCoS) display as a spatial light modulator, the LCOS display operating in at least one of a vertically aligned nematic (VAN) mode and a twisted vertically aligned nematic (TVAN) mode; and selecting and orienting an external retarder to increase a phase retardation of the spatial light modulator by a phase retardation of between 0 and 0.25 for each of the wavelengths in the set of illumination wavelengths.

2. The method of claim 1, wherein:

orienting the external retarder comprises orienting a slow axis of the external retarder to be parallel to a slow axis of the spatial light modulator.

3. The method of claim 2, further comprising:

positioning the retarder between the spatial light modulator and a polarizer having a polarization axis, wherein the slow axis of the retarder is rotated 45 degrees with respect to the polarization axis.

4. The method of claim 2, further comprising:

applying a drive voltage to the spatial light modulator, wherein:

a retardation of the spatial light modulator is a function of the drive voltage; and for each of the illumination wavelengths in the set of illumination wavelengths, the drive voltage for an off-state is set to an off-state drive voltage wherein a value of a combination of the phase retardation of the spatial light modulator and the phase retardation of the retarder is at or near 0.25 such that a contrast ratio is greater than 2000.

5. The method of claim 4, wherein at an on-state drive voltage that is greater than the off-state drive voltage, a maximum throughput for each illumination wavelength is present in a respective electro-optical curve.

6. The method of claim 4, wherein, at the respective off-state drive voltage, a zero or near-zero minimum is present in an electro-optical curve for each illumination wavelength.

7. The method of claim 1, further comprising:

receiving, at the spatial light modulator, incident light; and outputting, at the spatial light modulator, an image, wherein the image comprises at least three different colors that correspond to each of the illumination wavelengths in the set of illumination wavelengths, and wherein a contrast ratio for each of the three different colors is greater than 2000.

8. The method of claim 1, wherein the at least three different color spectrums comprise red, green, and blue color spectrums.

9. The method of claim 1, wherein a retardation of the retarder has a value that is less than one-fourth of a shortest illumination wavelength of the set of illumination wavelengths.

10. The method of claim 1, wherein the retarder increases the phase retardation of the spatial light modulator by a phase retardation $\phi$ for all illumination wavelengths that has a value in a range of 0.10 to 0.24 for all the illumination wavelengths.

11. A display system, comprising:

a spatial light modulator characterized by a first retardation and a first phase retardation, wherein the spatial light modulator has a first slow axis for light propagation, wherein the spatial light modulator is a liquid crystal on silicon (LCoS) display that operates in at least one of a vertically aligned nematic (VAN) mode and a twisted vertically aligned nematic (TVAN) mode; and a retarder that is positioned external to the spatial light modulator, wherein the retarder is characterized by a second retardation and a second phase retardation, the retarder comprising a second slow axis for light propagation at an orientation relative to the first slow axis, such that the retarder increases the first phase retardation by a phase retardation value between 0 and 0.25 for all illumination wavelengths in a set of illumination wavelengths, wherein the set of illumination wavelengths includes at least one illumination wavelength in each of at least three different color spectrums.

12. The display system of claim 11, wherein:

the orientation of the second slow axis is parallel to the first slow axis.

13. The display system of claim 12, further comprising:

a polarizer having a polarization axis, wherein the retarder is between the polarizer and the spatial light modulator, wherein the second slow axis is rotated 45 degrees with respect to the polarization axis.

14. The display system of claim 12, further comprising:

a voltage source that is configured to apply a drive voltage to the spatial light modulator, wherein:

a retardation of the spatial light modulator is a function of the drive voltage; and for each of the illumination wavelengths in the set of illumination wavelengths, the drive voltage for an off-state is set to an off-state drive voltage wherein a value of a combination of the phase retardation of the spatial light modulator and the phase retardation of the retarder is at or near 0.25 such that a contrast ratio is greater than 2000.

15. The display system of claim 14, wherein at an on-state drive voltage that is greater than the off-state drive voltage, a maximum throughput for each illumination wavelength is present in a respective electro-optical curve.

16. The display system of claim 14, wherein, at the respective off-state drive voltage, a zero or near-zero minimum is present in an electro-optical curve for each illumination wavelength.

17. The display system of claim 11, wherein:

the spatial light modulator is configured to receive incident light and output an image;

the image comprises at least three different colors that correspond to each of the illumination wavelengths in the set of illumination wavelengths; and a contrast ratio for each of the three different colors is greater than 2000.

18. The display system of claim 11, wherein the at least three different color spectrums comprise red, green, and blue color spectrums.

19. The display system of claim 11, wherein the second retardation has a value that is less than one-fourth of a shortest illumination wavelength of the set of illumination wavelengths.

20. The display system of claim 11, wherein the retarder increases the first phase retardation by a phase retardation $\phi$ for all illumination wavelengths that has a value in a range of 0.10 to 0.24 for all the illumination wavelengths.

* * * * *